United States Patent
Urquizo et al.

(10) Patent No.: US 7,095,831 B1
(45) Date of Patent: *Aug. 22, 2006

(54) DEVICES, SOFTWARES AND METHODS FOR SELECTIVELY LIMITING THE TOTAL MODEM-ON-HOLD TIMEOUT TIME OF A SINGLE LOG-IN SESSION

(75) Inventors: Alex Urquizo, Medford, MA (US); Vincent T. Grove, Concorde, MA (US)

(73) Assignee: Cisco Technology, Inc., San Jose, CA (US)

( * ) Notice: Subject to any disclaimer, the term of this patent is extended or adjusted under 35 U.S.C. 154(b) by 1119 days.

This patent is subject to a terminal disclaimer.

(21) Appl. No.: 09/966,927

(22) Filed: Sep. 27, 2001

(51) Int. Cl.
*H04M 11/00* (2006.01)

(52) U.S. Cl. .............................. 379/93.35; 379/93.28; 370/352; 375/222

(58) Field of Classification Search ............. 379/93.35, 379/93.28, 93.31, 93.09, 93.01, 93.14, 215.01; 370/352; 375/222
See application file for complete search history.

(56) References Cited

U.S. PATENT DOCUMENTS

| | | | |
|---|---|---|---|
| 6,345,088 B1 * | 2/2002 | Gu et al. ................. | 379/93.35 |
| 6,377,668 B1 * | 4/2002 | Smock et al. .......... | 379/142.08 |
| 6,690,776 B1 * | 2/2004 | Raasch .................... | 379/93.35 |
| 6,912,276 B1 * | 6/2005 | Olafsson et al. ......... | 379/93.35 |

* cited by examiner

*Primary Examiner*—Melur Ramakrishnaiah
(74) *Attorney, Agent, or Firm*—Marger Johnson & McCollom, P.C.

(57) ABSTRACT

Devices, softwares and methods limit the total Modem-On-Hold ("MOH") timeout time of a single log-in session. When a logged in user requests a Modem-On-Hold session, a server counts the cumulative time spent during individual MOH sessions. Once a limit is exceeded, then subsequent MOH requests are denied.

44 Claims, 5 Drawing Sheets

| USER DATABASE | DB2 |
|---|---|
| USER NAME | LOG-IN SESSION TIMEOUT TIME LIMIT (SEC) |
| USER1 | 120 |
| USER2 | 240 |
| USER3 | 60 |
| ... | ... |

| MH bits LSB:MSB | | | |
|---|---|---|---|
| 0:3 | Fill bits: 1111 | | |
| 4:11 | Frame sync: 01110010, where the left-most bit is first in time | | |
| 12:15 | Signal indication bits: | | |
| | 0011 | Mhreq | Request remote modem to go on-hold |
| | 0101 | Mhack | Indicate agreement to go on hold and timeout |
| | 0111 | Mhnack | Deny on-hold, request cleardown or fast reconnect |
| | 1001 | MHclrd | Request cleardown |
| | 1011 | Mhcda | Acknowledge cleardown |
| | 1101 | MHfrr | Request fast reconnect |
| 16:19 | Information bits: For signals Mhreq, MHcda and MHfrr repeat signal indication bits For Mhack: | | |
| | 16:19 | T1 – Timeout period for on-hold | |
| | For MHclrd: | | |
| | 16:19 | 0101 Cleardown due to incoming call 0110 Cleardown due to outgoing call 1010 Cleardown due to other reason | |
| | For Mhnack: | | |
| | 16:19 | 0101 Modem on Hold denied. Subsequent requests will be denied until current modem session terminates. 0111 Modem on Hold denied. Try again later. | |
| 20:35 | CRC | | |
| 36:39 | Fill bits: 1111 | | |
| NOTE 1 – Bit combinations not defined in bits 12-15 are reserved for the ITU. MH sequences with undefined bit combinations should be ignored. | | | |
| NOTE 2 – Bit combinations not defined in bits 16-19 for MHclrd and Mhnack are reserved for the ITU and should not be interpreted by the receiving modem. | | | |

FIG. 4

DEVICES, SOFTWARES AND METHODS FOR SELECTIVELY LIMITING THE TOTAL MODEM-ON-HOLD TIMEOUT TIME OF A SINGLE LOG-IN SESSION

CROSS REFERENCE TO RELATED APPLICATIONS

This application may be found to be related with another U.S. patent application Ser. No. 10/661,029 that is filed on the same day, has title: "Devices, Softwares and Methods for selectively limiting the duration of an individual modem-on-hold session", and which is hereby incorporated by reference in its entirety.

BACKGROUND OF THE INVENTION

1. Field of the Invention

The present invention is related to the field of modems and network servers, and more specifically to modems and servers that can request a Modem-On-Hold and can deny such a request under certain conditions.

2. Description of the Related Art

Networks, such as the internet, are increasingly used for communications. Typically a user subscribes with an Internet Service Provider ("ISP") that is connected to the internet. The user has a host device, such as a personal computer. The host device can communicate over a telephone line with a network device of the ISP, such as a server. Then the user and the ISP exchange data over the modem connection, typically in binary form.

The host device includes a modem, which communicates over the telephone line. The server has individual ports, one for each user that calls in with a modem to log in.

Recently modems that are made according to the International Telecommunications Union (ITU) V.92 standard provide a new feature, which is called the Modem-On-Hold ("MOH"). The modem sends a MOH request to temporarily discontinue ("place on hold") the modem connection. The server receives the MOH request, and grants it by temporarily discontinuing the modem connection.

The MOH feature is useful to the user, because the telephone line is temporarily released. Then it can be used to receive an incoming call, or to place an outgoing call.

The MOH feature, however, is detrimental to the internet service provider. While the modem connection is temporarily discontinued, the port assigned to it by the server remains committed to the user, but unused. As such, it may not be assigned to another user. A number of users could abuse the privilege, employing the MOH feature many times in a single log-in session.

BRIEF SUMMARY OF THE INVENTION

The present invention overcomes these problems and limitations of the prior art.

Generally, the present invention provides devices, softwares and methods for selectively limiting the total modem-on-hold timeout time of a single log-in session.

A network switch made according to the invention counts the cumulative time spent during individual MOH sessions of a user. Once a limit is exceeded, then subsequent MOH requests are denied. This results in network switches that make more effective use of their ports.

This and other features and advantages of the invention will become more readily apparent from the following Detailed Description, which proceeds with reference to the drawings, in which:

BRIEF DESCRIPTION OF THE DRAWINGS

FIG. 4 is a table showing proposed adaptations to an ITU recommendation for implementing the present invention.

DETAILED DESCRIPTION OF THE PREFERRED EMBODIMENT(S)

As has been mentioned, the present invention provides devices, softwares and methods for selectively limiting the total modem-on-hold timeout time of a single log-in session. The invention is now described in more detail.

Figure 1A:
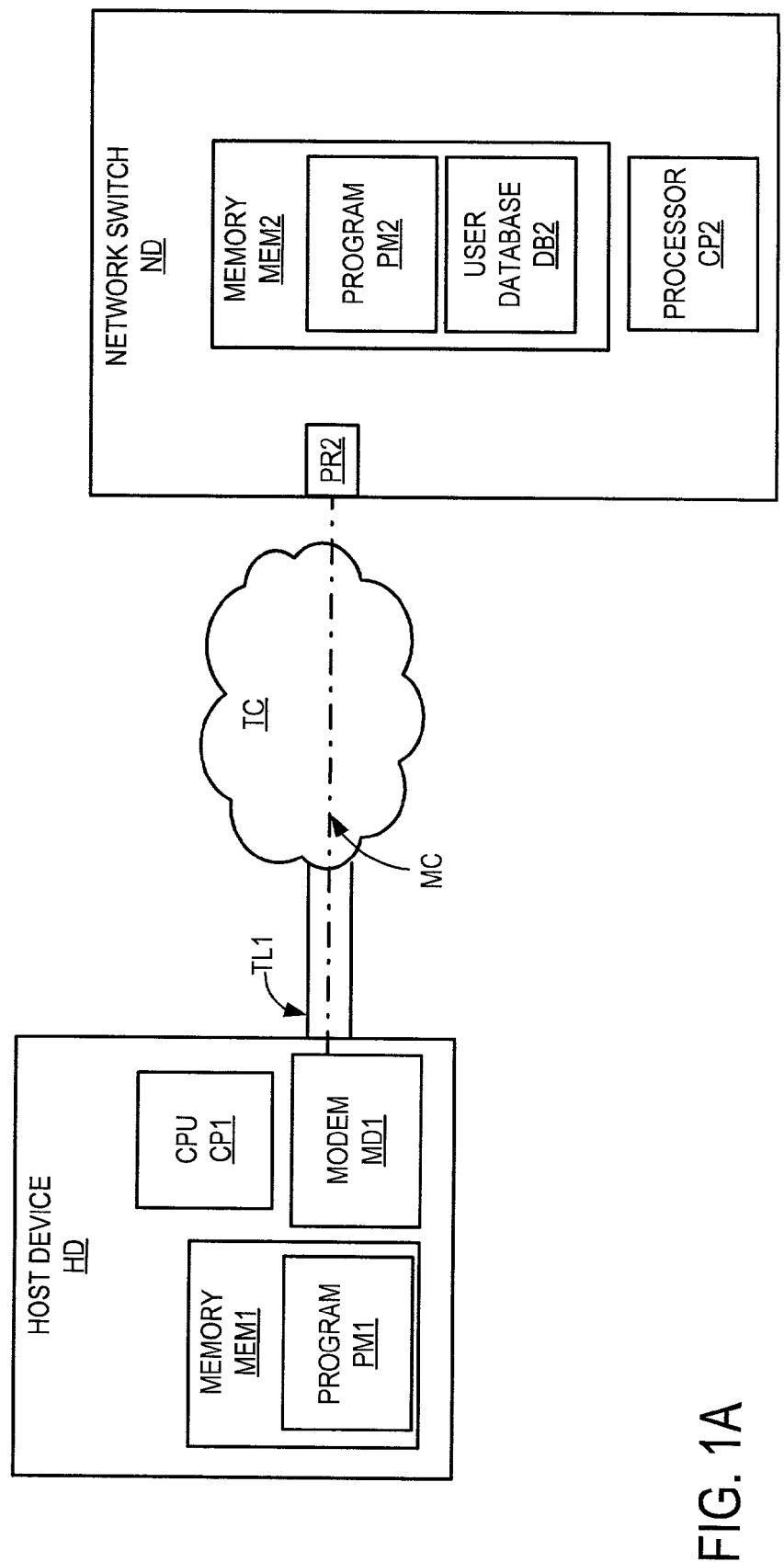
FIG. 1A is a diagram showing a host device made according to an embodiment of the invention communicating with a network device made according to an embodiment of the invention.

Referring now to FIG. 1A, an arrangement is shown of a host device HD communicating with a network switch ND, both of which are made according to the present invention. It will be understood that FIG. 1A shows only one of many possible arrangements. For example, host device HD may also communicate with a server that is not made according to the invention. Moreover, network switch ND may be accessed by a personal computer that is not made according to the invention.

Host device HD may be a personal computer. It includes a Central Processing Unit ("CPU") CP1, and a memory MEM1. CPU CP1 executes a program PM1 that resides on memory MEM1.

Importantly, host device HD includes a modem MD1. Modem MD1 is connected via a telephone line TL1 to the telephone cloud TC, which is also known as the telephone network.

Network switch ND may be any network switch, such as a server, a router, a gateway, a bridge, etc. Switch ND has at least one port PR2 for interfacing with the telephone cloud TC. Port PR2 may be directly coupled with another internal modem (not shown) of switch ND, etc., as is known in the art.

Switch ND also has a processor CP2. Processor CP2 may be implemented as a Digital Signal Processor (DSP), Central Processing Unit (CPU), or any other equivalent way known in the art.

Switch ND additionally includes a memory MEM2, on which a program PM2 may reside. Functions of processor CP2 may be controlled by program PM2, as will become apparent from the below. In addition, memory MEM2 includes a user database DB2, which may include user attributes.

Figures 1B, 1C:
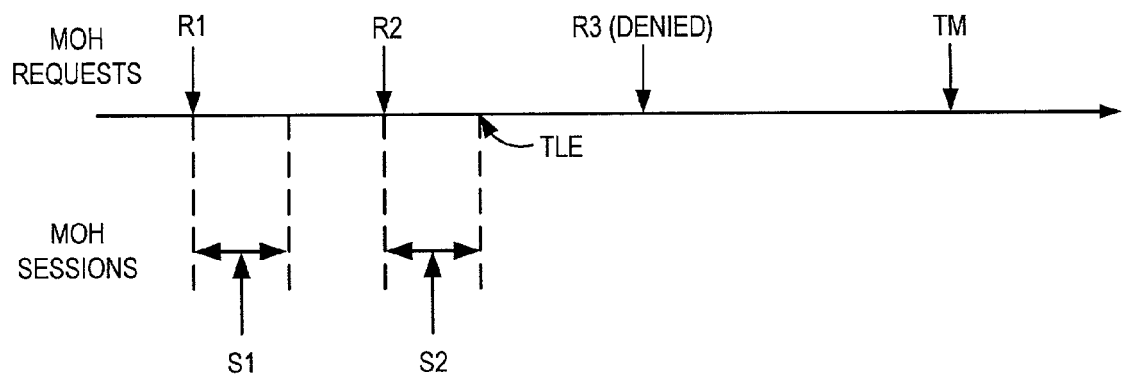
FIG. 1B is a diagram of a memory arrangement in the network device of FIG. 1A.
FIG. 1C is a time diagram for illustrating an operation of the invention.

Referring now to FIG. 1B, user database DB2 is described in more detail. Different users are assigned different modem-on-hold timeout time limits. This part of the invention may be accomplished by making the hold timeout time limits part of the user profile, and relying on the fact that the users have different profiles to begin with. It will be understood that, if network switch ND is implemented by more than one device, portions of user database DB2 may be distributed among such devices.

Returning to FIG. 1A, host device HD is able to establish a modem connection MC with network switch ND. The modem connection MC is from modem MD1 of host device HD, over telephone line TL1.

Host device HD is able to receive a line request. The line request may be directly from the user, or may be automated, e.g. when a call is incoming over telephone line TL1. The line request is for another use of telephone line TL1. More particularly, the line request is for temporarily releasing telephone line TL1, by temporarily placing modem connection MC on hold. Pursuant to the line request, host device HD first generates a Modem-On-Hold (MOH) request. The MOH request is transmitted via modem connection MC to network switch ND.

Network switch ND is capable of receiving the MOH request. The first time the MOH request is received, it is granted, which starts an individual MOH session. This way the line request may be accommodated. Alternately, depending on the settings and other arrangements, even the first MOH request may be denied.

Network switch ND also has a timer for measuring a cumulative duration of the individual durations of the individual MOH sessions. The timer is started when the first MOH request is granted. The timer is optionally stopped when modem connection MC is restored, as the individual MOH session ends. The timer is restarted upon granting the second MOH request, and so on. But, if during the first or a subsequent MOH individual session a log-in session timeout time limit is reached or exceeded, then the next MOH request is simply not granted.

In addition, network switch ND may optionally transmit a warning message to that effect to host device HD. The warning may be that the next MOH request will be ignored. An additional feature may be that a reason may be given, such as "Total timeout time exceeded".

Host device HD is optionally able to receive the warning message. Once it receives it, the next line request does not result in an MOH request.

Referring to FIG. 1C, the invention is explained along a time axis TM, which shows the times when MOH requests R1, R2, R3 are made. Requests R1, R2 are granted, resulting in respective MOH sessions S1, S2. In the example of FIG. 1C, second session S2 ends at point TLE, which is the point where the sum of the durations S1, S2 reaches the total cumulative timeout limit. Accordingly, request R3 is denied.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 2:
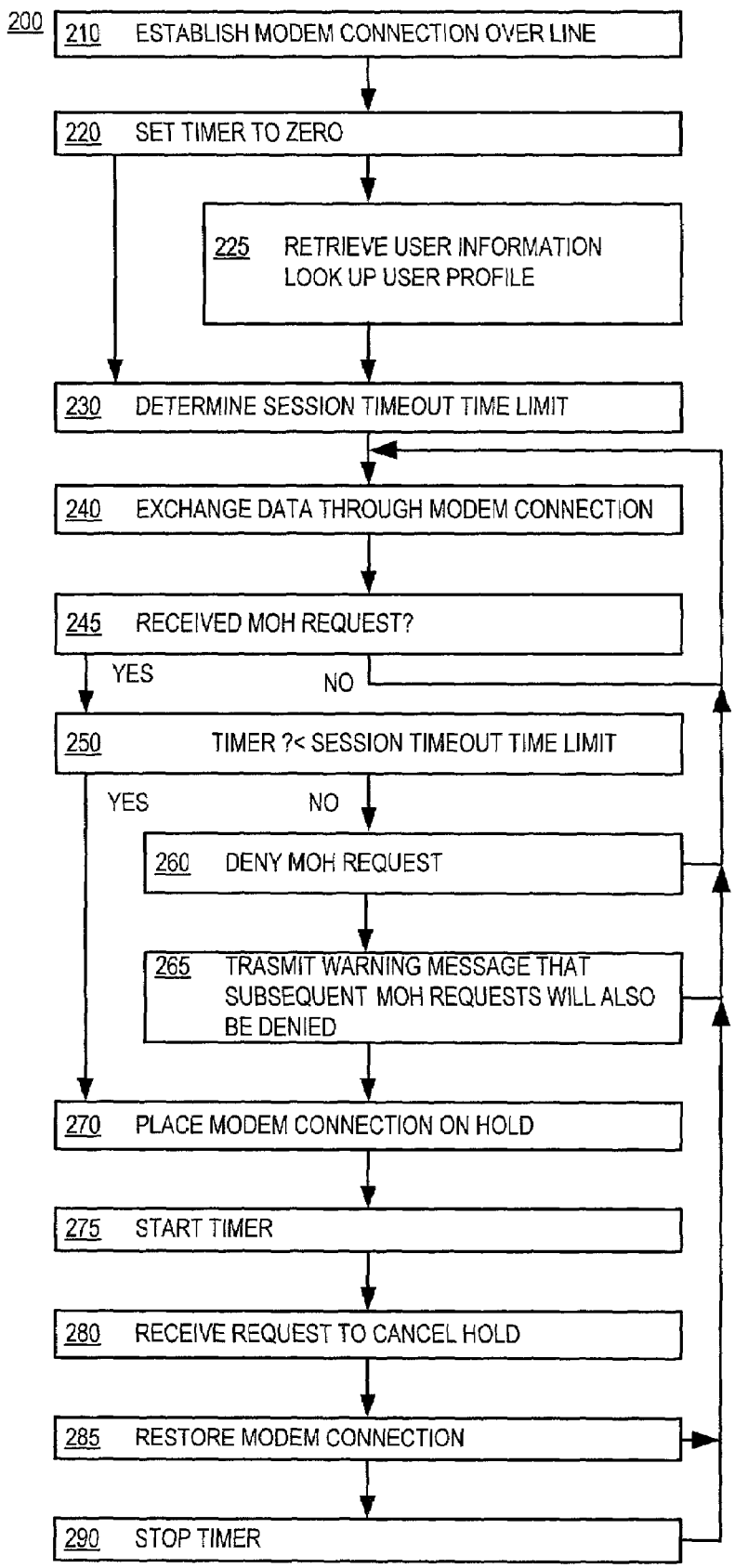
FIG. 2 is a flowchart illustrating methods according to embodiments of the present invention.

Referring now to FIG. 2, a flowchart 200 is used to illustrate a method according to an embodiment of the invention. The method of flowchart 200 may also be practiced by network switch ND of FIG. 1A. Or it may be equivalently practiced by a combination of cooperating network switches, such as an access server and a controlling server. The controlling server may be one that performs Remote Dial-In User Service.

According to a box 210, a modem connection MC is established with a modem over a telephone line. This starts a log-in session. Authentication and authorization processes are performed at this time, by entering a user identification, a password, etc. These received data serve to identify the user.

The data exchange may serve to identify the users of the first and second modems. Identification may take place by using an Authentication, Authorization, and Accounting (AAA) server, although the invention is not limited in this regard. Such an AAA server usually performs these AAA functions by interacting with network access or gateway devices and databases and directories containing user information. The interaction may be by according to a suitable standard. An example of such a standard today is the RADIUS (Remote Authentication Dial In User Service) standard.

According to an optional next box 220, a timer is set to zero. It will be understood that the preferred implementation of a timer is by simply keeping track of a new time variable.

According to an optional next box 230, a log-in session timeout time limit is determined. This would be a new attribute in the protocol, according to the present invention. The log-in session timeout time limit may be a default maximum timeout value, specified through the appropriate tool, such as modemcaps.

Modemcaps is an informal name for a database that contains elements of a modem capability. The database is used to configure the modem, usually when it becomes idle.

Alternately, the time limit may be determined according to an optional box 225, by looking up data about the identified user. The data may include a user profile, stored in a database of the network switch. Each user may have a different log-in session timeout time limit, for example according to the subscription agreement with the ISP. These may be performed during the authentication and authorization processes.

In the event the method of the invention is being performed by cooperating network switches, the controlling server sends to the access server a Modem-On Hold attribute. Then this data will be sent to a registration, admission, and status protocol platform of the remote access server (RAS). A RAS platform is a remote access server, access gateway, or any device that contains features for terminating a modem session or a voice session.

According to an optional next box 240, data is exchanged with the modem over the modem connection.

According to an optional next box 245, it is inquired whether a MOH request has been received. While not, execution returns to box 240.

If a MOH request is received at box 245, then according to an optional next box 250, it is determined whether the timer has reached a time less than a preset log-in session timeout time limit. If not, then according to an optional next box 260, the MOH request is denied. Plus a reason may be given, such as "total timeout time exceeded". Execution may then return to box 240. Or execution may first proceed to an optional next box 265, where a warning message is transmitted. The warning message may be that subsequent MOH requests will be denied. The warning message might not be heeded, however, if a receiving host device is not made to understand it.

The first time box 250 is encountered, the answer will be yes. If yes, according to an optional next box 270 the MOH request is granted. The modem connection is placed on hold.

According to a next box 275, the timer is started.

According to an optional next box 280, a request is received to cancel the hold, by restoring the modem connection.

According to a next box 285, the modem connection is restored, thus ending the individual MOH session. Execution may then return to box 240.

Alternately, according to an optional next box 290, the timer may be stopped. This way the timer keeps track of the cumulative durations of the individual MOH sessions.

Figure 3:
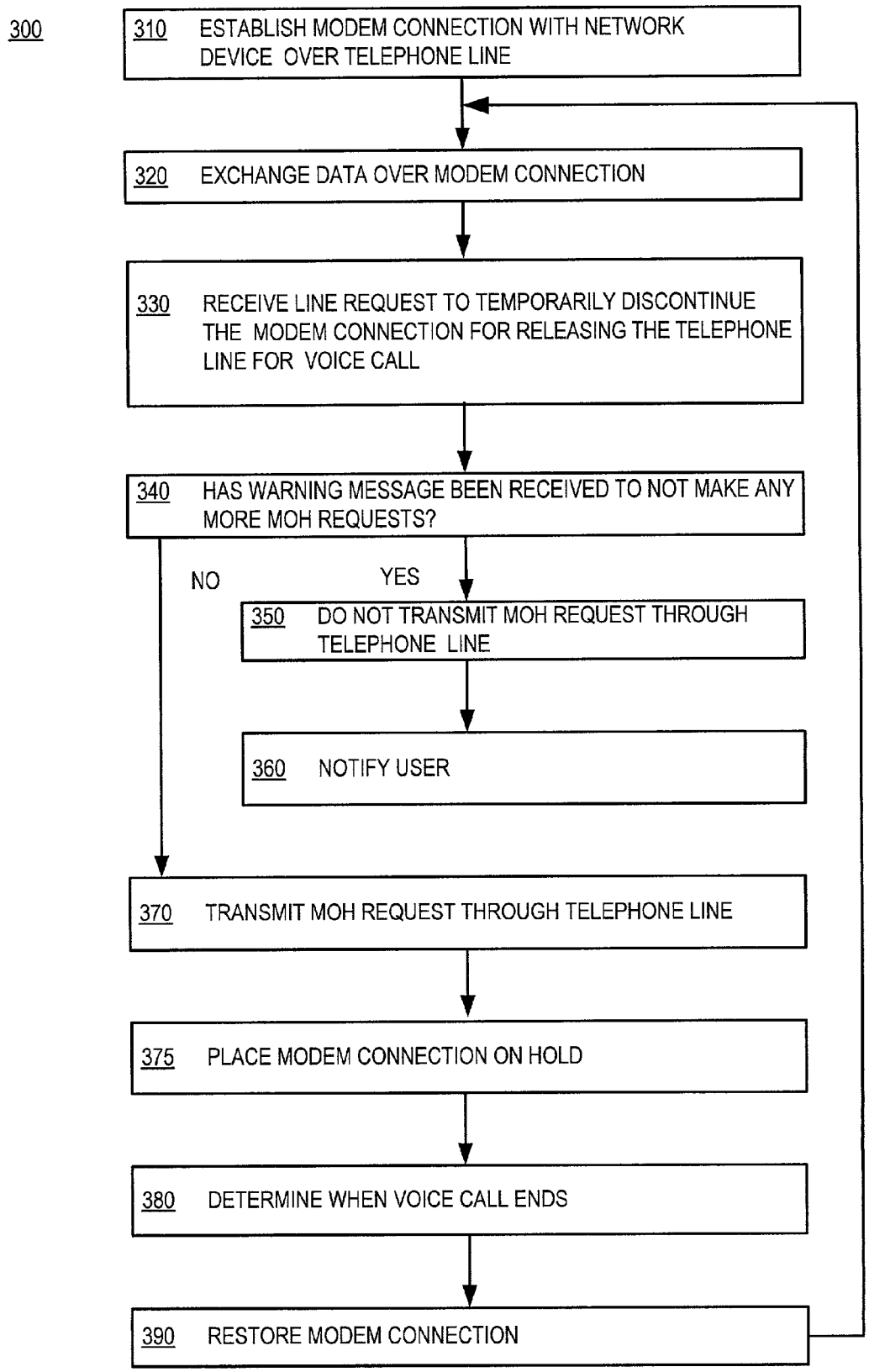
FIG. 3 is a flowchart illustrating a method according to another embodiment of the present invention.

Referring now to FIG. 3, a flowchart 300 is used to illustrate a method according to another embodiment of the invention. The method of flowchart 300 may also be practiced by host device HD of FIG. 1A.

According to a box 310, a modem connection is established with a network device over a telephone line. This starts a log-in session.

According to an optional next box 320, data is exchanged with the network device over the modem connection.

According to an optional next box 330, a line request is received to transmit to the network device a new MOH request. This will have the effect of temporarily discontinuing the modem connection for releasing the telephone line.

According to an optional next box 340, it is inquired whether a warning message has been received to not make any more MOH requests. If yes, then according to a next box 350 the new MOH request is not transmitted over the telephone line. That is responsive to having received the warning message of box 340, notwithstanding having received the line request of box 330. Then according to an optional next box 360, the user is notified accordingly.

If at box 340 a warning message has not been received, then according to an optional next box 370, the new MOH request is transmitted through the telephone line.

According to a next box 375, the modem connection is placed on hold.

According to an optional next box 380, it is determined when the voice call ends.

According to an optional next box 390, the modem connection is restored. Execution then returns to box 320.

Referring now to FIG. 4, an implementation of the invention is shown. An extra entry is made in the MOH "Information bits" field, to communicate to the client modem not to send more requests for a particular modem session, as these additional requests will be denied by the server.

The table of FIG. 4 shows the changes made to the current definition of this table. There is no change to the current V.92 modem-on-hold implementation, if the server simply denies the request for modem-on-hold (reason for denial: "Modem on Hold denied. Try again later").

But if the server will not accept subsequent "requests" because the cumulative hold period for the current session has been exceeded, then the Mhnack sequence is accompanied by a new value in the "information bits" field. The client modem should understand this new value (or reason for denial) as subsequent requests will be denied until the current modem session terminates.

Reason for denial in bits 16–19 for Mhack should be interpreted by the requesting modem as follows:

0111 The current request for modem-on-hold has been denied. The modem may ask for another modem-on-hold request later.

0101 The current request for modem-on-hold has been denied. Future requests for modem-on-hold will also be denied, therefore, the modem should not make another modem-on-hold request due to an outgoing call request during this session.

In order to avoid continuous retrains or a session disconnect, the client modem should not request a modem-on-hold event through out the remainder of the current modem session. This procedure can also be applied in the opposite case of server requesting modem-on-hold.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
   a telephone port for coupling to a telephone network; and
   a processor coupled with the telephone port, wherein the processor is adapted to establish a modem connection with a modem over a telephone line;
   exchange data with the modem over the modem connection;
   receive from the modem a first request for temporarily discontinuing the modem connection;
   grant the first request and starting a timer;
   receive from the modem a second request for temporarily discontinuing the modem connection again;
   consult the timer to determine whether a log-in session timeout time limit has been exceeded; and
   if the log-in session timeout time limit has been exceeded, deny the second request.

2. The device of claim 1, wherein the processor is further adapted to:
   transmit to the modem a warning message that subsequent requests will also be denied.

3. The device of claim 1, wherein the processor is further adapted to:
   additionally transmit a reason for denying the second request.

4. The device of claim 1, wherein the processor is further adapted to:
   if the log-in session timeout time limit has not been exceeded, restart the timer.

5. The device of claim 1, wherein
   the log-in session timeout time limit is a preset default maximum timeout value.

6. The device of claim 1, wherein the processor is further adapted to:
   determine the log-in session timeout time limit.

7. The device of claim 6, wherein the processor is further adapted to:
   receive information to identify a user; and
   look up data about the identified user to determine the log-in session timeout time limit.

8. A device comprising:
   a modem for coupling to a telephone network; and
   a processor coupled with the modem, wherein the processor is adapted to establish a modem connection with a network device over a telephone line;
   exchange data with the network device over the modem connection;
   transmit through the modem connection a first request for temporarily discontinuing the modem connection;
   temporarily discontinue the modem connection pursuant to the first request; and
   receive from the network device a warning message that a next request for temporarily discontinuing the modem connection will be denied.

9. The device of claim 8, wherein the processor is further adapted to:
   additionally receive a reason for the warning message.

10. The device of claim 8, wherein the processor is further adapted to:
    receive a line request to transmit to the network device a new Modem on Hold (MOH) request for temporarily discontinuing the modem connection after receiving the warning message; and
    not transmit the new MOH request over the telephone line responsive to having received the warning message.

11. The device of claim 10, wherein the processor is further adapted to:
    notify a user that the line request is denied.

12. A device comprising:
    means for establishing a modem connection with a modem over a telephone line;
    means for exchanging data with the modem over the modem connection;
    means for receiving from the modem a first request for temporarily discontinuing the modern connection;
    means for granting the first request;
    means for starting a timer in association with the means for granting the first request;
    means for receiving from the modem a second request for temporarily discontinuing the modem connection again;
    means for consulting the timer to determine whether a log-in session timeout time limit has been exceeded; and
    if the log-in session timeout time limit has been exceeded, means for denying the second request.

13. The device of claim 12, further comprising:
means for transmitting to the modem a warning message that subsequent requests will also be denied.
14. The device of claim 12, further comprising:
means for additionally transmitting a reason for denying the second request.
15. The device of claim 12, further comprising:
if the log-in session timeout time limit has not been exceed, means for restarting the timer.
16. The device of claim 12, wherein
the log-in session timeout time limit is a preset default maximum timeout value.
17. The device of claim 12, further comprising:
means for determining the log-in session timeout time limit.
18. The device of claim 17, further comprising:
means for receiving information to identify a user; and
means for looking up data about the identified user to determine the log-in session timeout time limit.
19. A device comprising:
establishing a modem connection with a network device over a telephone line;
exchanging data with the network device over the modem connection;
transmitting through the modem connection a first request for temporarily discontinuing the modem connection;
temporarily discontinuing the modem connection pursuant to the first request; and
receiving from the network device a warning message that a next request for temporarily discontinuing the modem connection will be denied.
20. The device of claim 19, further comprising:
means for additionally receiving a reason for the warning message.
21. The device of claim 19, further comprising:
means for receiving a line request to transmit to the network device a new request for temporarily discontinuing the modem connection after receiving the warning message; and
means for not transmitting the new request over the telephone line responsive to having received the warning message.
22. The device of claim 21, further comprising:
means for notifying a user that the line request is denied.
23. An article comprising: a storage medium, the storage medium having instructions stored thereon, wherein when the instructions are executed by at least one device, they result in:
establishing a modem connection with a modem over a telephone line;
exchanging data with the modem over the modem connection;
receiving from the modem a first request for temporarily discontinuing the modem connection;
granting the first request and starting a timer;
receiving from the modem a second request for temporarily discontinuing the modem connection again;
consulting the timer to determine whether a log-in session timeout time limit has been exceeded; and
if the log-in session timeout time limit has been exceeded, denying the second MOH request.
24. The article of claim 23, wherein the instructions further result in:
transmitting to the modem a warning message that subsequent requests will also be denied.
25. The article of claim 23, wherein the instructions farther result in:
additionally transmitting a reason for denying the second MOH request.
26. The article of claim 23, wherein the instructions further result in:
if the log-in session timeout time limit has not been exceeded, restarting the timer.
27. The article of claim 23, wherein
the log-in session timeout time limit is a preset default maximum timeout value.
28. The article of claim 23, wherein the instructions further result in:
determining the log-in session timeout time limit.
29. The article of claim 28, wherein the instructions further result in:
receiving information to identify a user; and
looking up data about the identified user to determine the log-in session timeout time limit.
30. An article comprising: a storage medium, the storage medium having instructions stored thereon, wherein when the instructions are executed by at least one device, they result in:
establishing a modem connection with a network device over a telephone line;
exchanging data with the network device over the modem connection;
transmitting through the modem connection a first request for temporarily discontinuing the modem connection;
temporarily discontinuing the modem connection pursuant to the first request; and
receiving from the network device a warning message that a next request for temporarily discontinuing the modem connection will be denied.
31. The article of claim 30, wherein the instructions further result in:
additionally receiving a reason for the warning message.
32. The article of claim 30, wherein the instructions further result in:
receiving a line request to transmit to the network device a new request for temporarily discontinuing the modem connection after receiving the warning message; and
not transmitting the new request over the telephone line responsive to having received the warning message.
33. The article of claim 32, wherein the instructions further result in:
notifying a user that the line request is denied.
34. A method comprising:
establishing a modem connection with a modem over a telephone line;
exchanging data with the modem over the modem connection;
receiving from the modem a first request for temporarily discontinuing the modem connection;
granting the first request and starting a timer;
receiving from the modem a second request for temporarily discontinuing the modem connection again;
consulting the timer to determine whether a log-in session timeout time limit has been exceeded; and
if the log-in session timeout time limit has been exceeded, denying the second request.
35. The method of claim 34, further comprising:
transmitting to the modem a warning message that subsequent requests will also be denied.
36. The method of claim 34, further comprising:
additionally transmitting a reason for denying the second request.

37. The method of claim 34, further comprising:
if the log-in session timeout time limit has not been exceeded, restarting the timer.

38. The method of claim 34, wherein
the log-in session timeout time limit is a preset default maximum timeout value.

39. The method of claim 34, further comprising:
determining the log-in session timeout time limit.

40. The method of claim 39, further comprising:
receiving information to identify a user; and
looking up data about the identified user to determine the log-in session timeout time limit.

41. A method comprising:
establishing a modem connection with a network device over a telephone line;
exchanging data with the network device over the modem connection;
transmitting through the modem connection a first request for temporarily discontinuing the modem connection;
temporarily discontinuing the modem connection pursuant to the first request; and
receiving from the network device a warning message that a next request for temporarily discontinuing the modem connection will be denied.

42. The method of claim 41, further comprising:
additionally receiving a reason for the warning message.

43. The method of claim 41, further comprising:
receiving a line request to transmit to the network device a new Modem on Hold (MOH) request for temporarily discontinuing the modem connection after receiving the warning message; and
not transmitting the new MOH request over the telephone line responsive to having received the warning message.

44. The method of claim 43, further comprising:
notifying a user that the line request is denied.

\* \* \* \* \*

UNITED STATES PATENT AND TRADEMARK OFFICE
CERTIFICATE OF CORRECTION

PATENT NO. : 7,095,831 B1
APPLICATION NO. : 09/966927
DATED : August 22, 2006
INVENTOR(S) : Urquizo et al.

It is certified that error appears in the above-identified patent and that said Letters Patent is hereby corrected as shown below:

At column 8, line 22, please replace "modern" with --modem--.

At column 9, line 52, please replace "modern" with --modem--.

At column 10, line 2, please replace "farther" with --further--.

Signed and Sealed this

Eighth Day of May, 2007

JON W. DUDAS
*Director of the United States Patent and Trademark Office*